Oct. 8, 1963  B. BULOVIC  3,106,333
LAMINATED PACKAGE WRAPPER WITH TEAR STRIP
Filed April 14, 1960
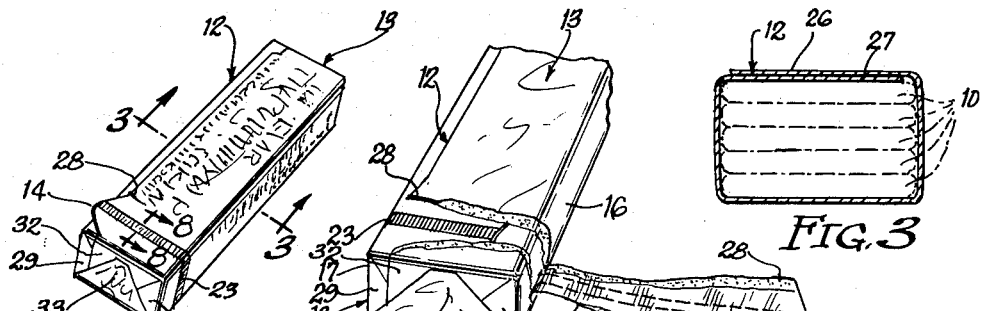
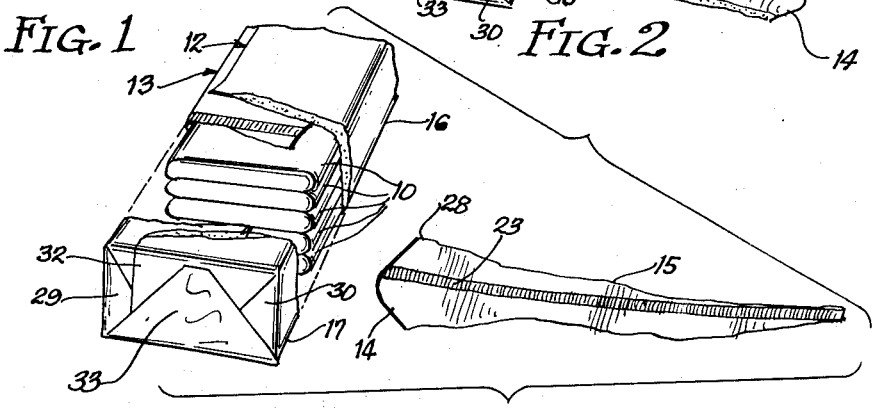
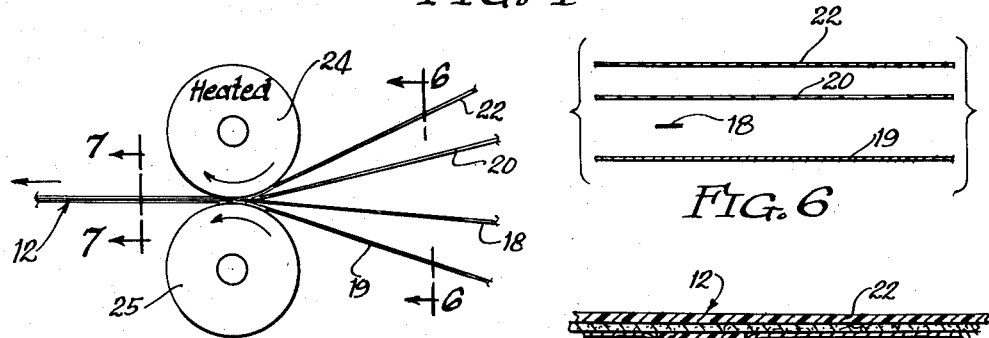
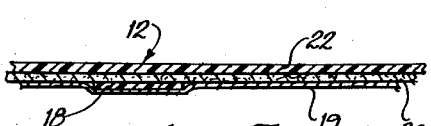
INVENTOR.
Bozdar Bulovic
BY Horton Davis,
Brewer & Brugman
Attorneys

United States Patent Office 3,106,333
Patented Oct. 8, 1963

3,106,333
LAMINATED PACKAGE WRAPPER WITH
TEAR STRIP
Bozdar Bulovic, Chicago, Ill., assignor to Wm. Wrigley, Jr. Company, Chicago, Ill., a corporation of Delaware
Filed Apr. 14, 1960, Ser. No. 22,159
1 Claim. (Cl. 229—87)

This invention relates to laminated package wrappers, and more particularly to package wrappers made up of a plurality of layers of sheet material which are adhered together and which have a tear strip adhered between and laminated with the layers at a preselected position.

Although not necessarily or in any way limited thereto, and although having many additional advantages and meritorious characteristics, the package wrapper disclosed herein is particularly adapted to use on relatively small packages which are hermetically sealed, such, for example, as those used on chewing gum, confections and the like.

In a laminated wrapper of the type herein contemplated, various kinds of material suited to different purposes can be used together on a package to accomplish desired results, and yet the package can be wrapped in a single wrapping operation, as contrasted to having separate wraps or layers individually applied as separate operations and being further confronted with the problem of having an end of the tear strip exposed for use through an outer wrapper which is applied thereover. Furthermore, the adhered layers of my laminated wrapper reinforce one another and provide a firm and durable composite structure which is not easily dislodged or wrinkled and in which printing on an inner layer is clearly visible through an outer transparent layer, such as cellophane.

With these and other advantages of the disclosed structure in mind, it is an object of my invention to provide a plural layer package wrapper having a tear strip for serving portions thereof and wherein the tear strip is laminated with, and bonded between wrapper layers, so that the tendency is minimized for the tear strip to pull free of the wrapper before it has completely severed the wrapper portions.

Another object of this invention is to provide a plural layer package wrapper having a tab on the wrapper for indicating the position of the tear strip and providing ready access thereto for use, and in which wrapper the tear strip is laminated between adhered wrapper layers and bonded thereto, so that the end of the tear strip will not become separated from the tab in a manner permitting the tab to be gripped and torn off without the tear strip being picked up with the tab to serve its intended purpose without additional effort.

As another object, the invention herein disclosed comprehends the provision of a plural layer package wrapper including a tear strip for severing all of the wrapper layers, and wherein the structure and relationships of parts are such that the presence of the tear strip does not interfere with the hermetic sealing of the package.

My invention further has within its purview the provision of a package wrapper in which the tear strip may be made of colorless or transparent material at a saving in cost and without detriment to the use or operativeness of the tear strip.

It is another object of this invention to provide a package wrapper which includes a tear strip and wherein the structure and arrangement of the wrapper components minimizes the likelihood of the tearing of the wrapper in a direction materially angular to the longitudinal dimension of the tear strip.

Other objects of this invention will become apparent from the following detailed description when taken together with the accompanying drawings, in which:

FIG. 1 is a perspective view of a package wrapped in a laminated package wrapper including a tear strip and embodying a preferred form of this invention;

FIG. 2 is a fragmentary perspective view of a portion of the package illustrated in FIG. 1 after the tear strip has been utilized to partially effect a severance of portions of the wrapper;

FIG. 3 is an end sectional view taken substantially as indicated by a line 3—3 and accompanying arrows in FIG. 1 and which shows the overlap of end portions of the wrapper;

FIG. 4 is a fragmentary perspective view depicting several and separated portions of my package wrapper after the tear strip has been utilized for effecting complete severance of wrapper portions;

FIG. 5 is a diagrammatic side view illustrating one manner of effecting lamination and adhesion of component layers and parts of my laminated package wrapper;

FIG. 6 is an end sectional view showing the separated component parts of my package wrapper and is taken substantially as indicated by a line 6—6 and accompanying arrows in FIG. 5;

FIG. 7 is a fragmentary end sectional view of the laminated and bonded layers of the laminated package wrapper and tear strip, and is taken substantially as indicated by a line 7—7 and accompanying arrows in FIG. 5; and FIG. 8 is a fragmentary end sectional view of a portion of the structure of the overlapped wrapper parts taken substantially as indicated by a line 8—8 in FIG. 1, and drawn to a larger scale to illustrate details of the disclosed structure.

For purposes of disclosure, the exemplary embodiment of the invention which is shown herein for illustrative purposes depicts my laminated package wrapper and tear strip in an application to a package of chewing gum, wherein a plurality of gum sticks 10 is enclosed in an outer wrapper 12 to provide a sealed, neat appearing and durable package 13 which may be readily opened by grasping a projecting tab 14 and tearing away a strip 15 which extends around the package and effects a complete severance of two portions 16 and 17 of the wrapper. In the disclosed combination, the strip 15 of the package wrapper which is torn away includes a relatively narrow tear strip 18 in the form of a ribbon of a flexible and relatively tough material, which tear strip is coextensive with the wrapper encompassing the package and, in the present embodiment, is located near one end of the package, so that after the end portion 17 of the outer wrapper is severed and removed, the gum sticks 10 are accessible at the end of the package and those remaining are held together in a group by the portion 16 of the wrapper.

Considering the structure of the disclosed wrapper 12 in greater detail, and having particular reference to FIGS. 5, 6, 7 and 8 of the drawings, it is composed of a plurality of superposed layers which are bonded together to form a laminated composite wrapper structure which can be cut to length and applied to the package contents in a single wrapping operation. In the particular form depicted, the layers constitute an inner sheet of metal foil 19, an intermediate sheet of paper 20 and an outer sheet 22 of a transparent material, such as cellophane. The tear strip 18, in the disclosed structure, comprises a relatively narrow ribbon of cellophane and is disposed between the adjacent foil and paper layers 19 and 20, and is bonded to both. In my preferred structure, the paper layer 20 has printed matter thereon, including a readily visible printed line 23 which substantially overlies and is aligned with the tear strip 18 and which printed matter and line 23 are visible on the exterior of the wrapper and wrapped package through the transparent outer layer 22. Also, the paper layer 20 is waxed and, in my preferred structure, wax is used as a heat sensitive bonding material for adhering the layers together and for adhering the tear strip 18 to the adjacent layers, between which it is disposed. In one manner of fabrication, the separate layers of material, in strip form, are fed between a heated roll 24 and a pressure roll 25 from suitable sources of supply and are thus united into a composite laminated wrapper structure, as depicted in FIG. 5.

After being thus laminated, the wrapper is cut to lengths which, when wrapped around the assembled contents, provide overlapping portions 26 and 27 as shown in FIGS. 3 and 8, which portions are adhered and sealed together desirably by a heat sealing operation, along a portion extending longitudinally of the package, thereby providing an essential part of an hermetic seal for the package. With this disclosed structure, and since the tear strip 18 is disposed between adjacent layers of the wrapper, so as to be an internal part of the wrapper structure, the seal which extends longitudinally of the package between the overlapped portions 26 and 27 is between the continuous inner or foil layer 19 of the outer wrapper portion 26 and the continuous outer or cellophane layer 22 of the wrapper portion 27 which is overlapped. As depicted in FIG. 8, the tear strip, in the position depicted, does not present any problem in affording a possibility of interrupting the continuity of the seal between the adhered portions 26 and 27 which might occur if the tear strip were on the interior of the surface of the wrapper.

In severing the pieces of wrapping material for each package from the laminated strip, a curve is provided in the cut which defines the tab 14, which tab extends somewhat to the opposite sides of the tear strip 18 and is placed on the exterior of the package wrapper, as an extension of the outer portion 26, and desirably so that it is adjacent one corner of the wrapped package, so that it is readily accessible to be lifted and gripped when the package is to be opened. To facilitate the start of the tear which severs the portions 16 and 17 of the package wrapper, a slit 28 is provided at the side of the tab 14 which is remote from the adjacent end of the package. This slit extends a relatively short distance into the wrapper from the severed tab defining edge of the wrapper and is in generally parallel relationship to the tear strip.

Being laminated between adjacent layers of the wrapper, and being adhered to the wrapper layers which are also bonded to one another, the tear strip does not become separated from its signal tab, as it might if it were on the inner surface of the wrapper, and is consequently always gripped with the tab. Thus, since the tear strip is always grasped with the tab, and since the printed line 23 on the exterior of the package further indicates the position of the tear strip, uncolored transparent material, such as clear and uncolored cellophane may be utilized as the tear strip, at a considerable saving in cost, and without affording any problem in visually locating the tear strip if it could become separated from the tab. Furthermore, since the tear strip 18 is coextensive with the wrapper layers and is firmly adhered therebetween, the possibility of having the tear strip pull away from the wrapper layers before it has accomplished its full purpose in severing portions of the wrapper, is definitely minimized.

The width of the strip material which comprises the layers of the laminated wrapper is greater than the length of the package contents, so that when wrapped around the contents, the wrapper projects beyond the contents at both ends, thereby providing material for a folded end seal. In the disclosed structure, both ends are alike and side portions 29 and 30 thereof are folded in against the ends of the contents to form two end flaps 32 and 33 of generally triangular shape which are folded against the ends of the package over the portions 29 and 30 and in overlapping relationship to one another. After being thus folded, the overlapping portions and flaps are sealed together to complete the hermetic sealing of the package.

From the foregoing description and reference to the accompanying drawings, it may be understood that I have provided a laminated package wrapper embodying a tear strip and which has many advantages over others which have been developed, as enumerated herein, and in which the tear strip is laminated between adjacent layers and bonded to those layers, and in which the layers are bonded together, so that all layers are torn by the tear strip simultaneously, even though the tear strip is exterior to one of the layers.

Having thus described my invention, what I claim as new and desire to secure by Letters Patent of the United States is:

A laminated package wrapper comprising, in combination, an inner metal foil layer, an intermediate paper layer, and an outer layer of transparent material, said layers being of substantially equal width and being superposed with their edges substantially aligned and having their adjacent surfaces bonded together, a relatively narrow tear strip extending along one margin of the wrapper at a position spaced inwardly from one edge thereof and between the foil and paper layers, said tear strip being bonded to the normal surfaces of both the foil and the paper layers and being made of a colorless transparent material, and said paper layer having a printed line on the outer surface thereof which is in coinciding relation to and coextensive with the tear strip.

References Cited in the file of this patent

UNITED STATES PATENTS

| | | |
|---|---|---|
| 1,943,538 | Kahn | Jan. 16, 1934 |
| 2,008,361 | Lindsey | July 16, 1935 |
| 2,183,330 | Drew | Dec. 12, 1939 |
| 2,295,231 | Milmoe et al. | Sept. 8, 1942 |
| 2,400,390 | Clunan | May 14, 1946 |
| 2,467,875 | Andrews | Apr. 19, 1949 |
| 2,592,734 | Pike | Apr. 15, 1952 |
| 2,611,483 | Adams | Sept. 23, 1952 |
| 2,767,900 | Bouteloup | Oct. 23, 1956 |
| 2,952,395 | Spees | Sept. 13, 1960 |
| 3,061,169 | Yermakoff | Oct. 30, 1962 |